No. 695,776. Patented Mar. 18, 1902.
W. F. WILLIAMS.
MEANS FOR SECURING ELASTIC TIRES TO WHEELS.
(Application filed Dec. 16, 1901.)
(No Model.) 2 Sheets—Sheet 1.

WITNESSES:

INVENTOR
William F. Williams
BY
ATTORNEYS

THE NORRIS PETERS CO., PHOTO-LITHO., WASHINGTON, D. C.

No. 695,776. Patented Mar. 18, 1902.
W. F. WILLIAMS.
MEANS FOR SECURING ELASTIC TIRES TO WHEELS.
(Application filed Dec. 16, 1901.)
(No Model.) 2 Sheets—Sheet 2.

WITNESSES:
INVENTOR
William F. Williams
BY
ATTORNEYS

UNITED STATES PATENT OFFICE.

WILLIAM FREDERICK WILLIAMS, OF LONDON, ENGLAND.

MEANS FOR SECURING ELASTIC TIRES TO WHEELS.

SPECIFICATION forming part of Letters Patent No. 695,776, dated March 18, 1902.

Application filed December 16, 1901. Serial No. 86,120. (No model.)

*To all whom it may concern:*

Be it known that I, WILLIAM FREDERICK WILLIAMS, gentleman, a subject of the King of Great Britain, residing at 4 Denman street, Piccadilly Circus, London, England, have invented new and useful Improvements in Means for Securing Elastic Tires to Wheels, of which the following is a specification.

My invention relates to improved means of securing elastic tires, whether solid, cushion, hollow, or tubular or whether provided with an outer cover and adapted to be clasped to the rim of the wheel by a band or bands; and the object of the invention is to provide a compact and efficient means of applying to the said band or bands the required tension and of maintaining the same.

The invention consists, essentially, of a combined tension-screw and worm-gear whereof the worm-wheel is adapted to act as a nut to apply the requisite tension to the screw, the tension-screw, which may be curved approximately to the curvature of the wheel-rim, being prevented from turning and being provided with a hook or other means of making detachable engagement with the one end of the holding-on band whereof the other end is fixed.

Reference is to be had to the accompanying drawings, wherein—

Figure 1:
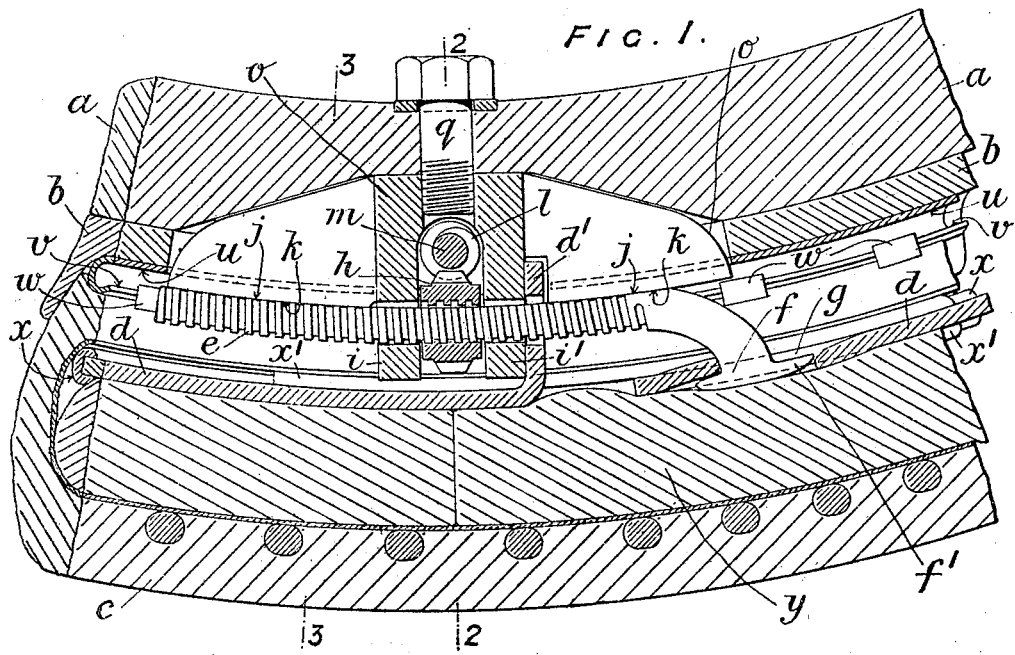
Figure 4:
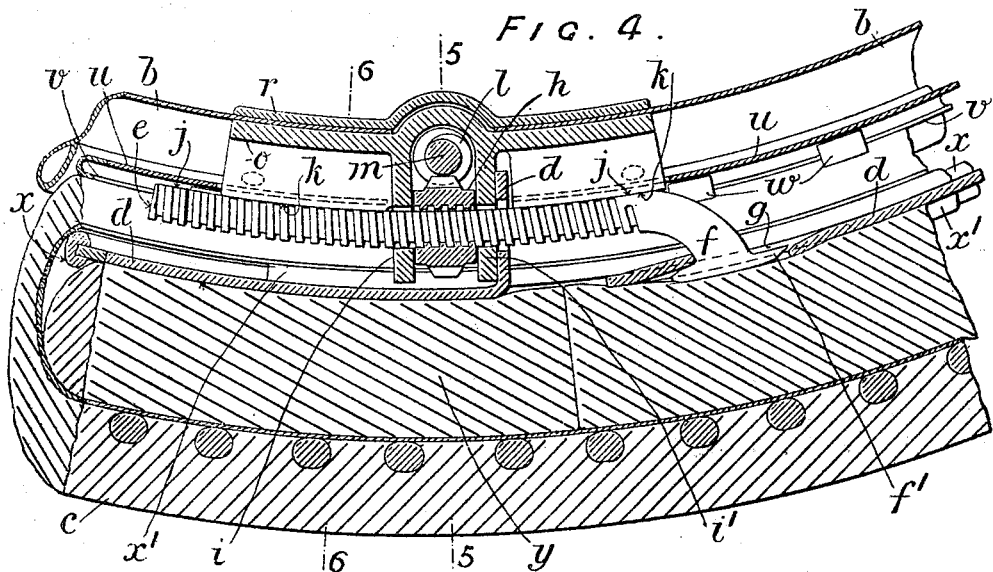
Figure 3:
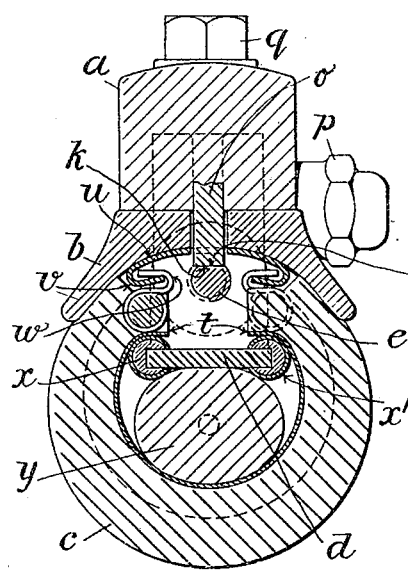
Figure 2:
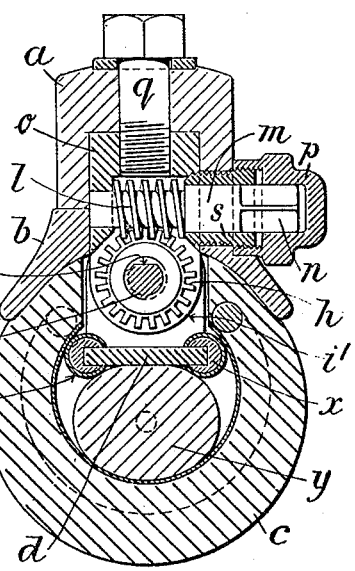
Figure 6:
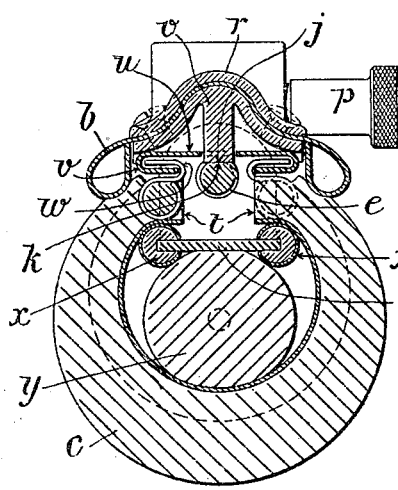
Figure 5:
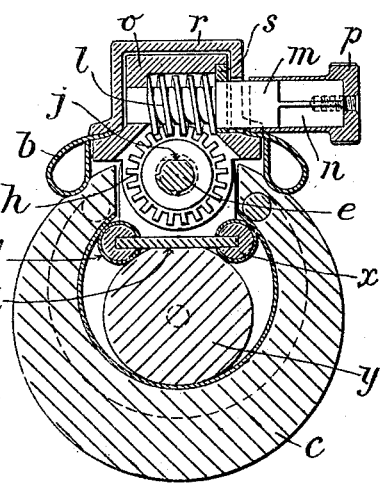

Figure 1 is a sectional side view, and Figs. 2 and 3 are sectional end views on lines 2 2 and 3 3, Fig. 1, respectively, of the means of tightening and securing the holding-on band, these figures showing the invention as applied to a wooden wheel. Figs. 4, 5, and 6 are similar views showing the invention as applied to a metal rim of the bicycle type.

In Figs. 1 to 3, $a$ is the wooden felly of the wheel, and in all the figures $b$ is the metal ring, $c$ the elastic tire of tubular section, and $d$ the holding-on band passing through the tire and clasping it to the rim.

$e$ is the tension-screw, provided at one end with a hook $f$, adapted to engage in a slot $g$ in the band $d$. This tension-screw passes through the bore of a toothed or worm wheel $h$, internally threaded to act as a nut for the screw, upon which the wheel is mounted to turn between a pair of stationary cheek-plates $i\ i'$, so as to be capable of revolving about the screw and of thereby imparting axial movement to the screw. The cheek-plates $i$ have guide-holes to give passage to the screw, which is preferably square-threaded and is prevented from revolving by a flat $j$ upon it bearing upon a stationary guide-surface $k$ or by a feather fixed to the one engaging in a groove in the other. The peripheral teeth of the worm-wheel are engaged by a tangent screw or worm $l$, formed on a spindle $m$, which may be mounted transversely of the wheel-rim, so as to present at the side thereof a squared or other end $n$, adapted for the application of a key or other means of turning it, or the spindle may be placed radially of the wheel, so as to present its squared end toward the center thereof or in any intermediate direction. The outer end of the spindle $m$ may be protected by a cap $p$, which may be secured by screwing on the bush $s$, as in Figs. 1 and 2, or on the spindle $m$, as in Figs. 4 and 5.

The teeth of the worm-wheel may be inclined and the edge of the wheel hollowed to correspond to the pitch and form of the worm-thread; but for the sake of economy in first cost it is preferred that the teeth of the worm-wheel should be straight spur-teeth, so as to admit of being formed on the wheel by stamping or otherwise.

The cheek-plates $i\ i'$, between which the worm-wheel is confined, are preferably made in one with a base portion or bracket $o$, received within the hollow of the wheel-rim $b$, so that the tension-screw passing axially through the worm-wheel will be in approximately circular alinement with and exert a pull in the circumferential direction on that part of the holding-on band to which the tension-screw is to be connected.

The bracket $o$ may be received in an aperture in the metal rim $b$, as indicated, and is drawn down into its seat therein by means of a screw $q$ in the case of a wooden wheel, while in the case of a metal wheel the bracket $o$ may have a base-plate that fits against the hollow of the wheel-rim, as shown, and may be secured by a cover-plate $r$, that fits against the opposite or inner side of the rim and is connected to the bracket by screws, thus serving both to draw the bracket $o$ to its seat and to compensate for the weakening of the wheel-rim by the aperture wherein the bracket $o$ is received.

The worm or tangent screw $l$ is journaled in the bracket $o$, and in order to enable the worm to be inserted in place after the bracket has been inserted in place in the rim the bearing for the one journal of the worm is formed by a bush $s$ of such diameter as when removed to leave an aperture sufficient to give passage to the threaded part of the worm, the bush being screwed or driven into place, and in the latter case being secured by the cap portion of the cover-plate $r$.

In order to admit the tension-screw $e$ within the jointless tubular tire, the latter has a longitudinal slot $t$ at the part next the wheel-rim, and a sliding cover-plate $u$ is adapted to close the slot and to complete the circular section of the tire, this cover $u$ having inwardly-turned side flanges $v$, adapted to make sliding engagement with outwardly-turned hooks or flanges $w$ at opposite sides of the slot $t$, said hooks being firmly secured to the body or foundation of the tire. As this mode of closing the slot $t$ forms the subject of another application for patent, it is not claimed under the present application. Instead of employing a sliding cover $u$, engaging with hooks, the opposite sides of the slot $t$ may be drawn together by lacing.

The fixed end of the holding-on band $d$ may be secured by any suitable means either directly to the wheel-rim or to the bracket $o$ or cheek-plates $i$. In the construction shown the end of the band is passed over the cheek-plates $i$ $i'$ and is bent at a right angle, as at $d'$, to engage the cheek-plate $i'$, this bent portion being apertured to give passage to the tension-screw $e$, which thus serves to secure the engagement of the band with the cheek-plate. The hole in the bent portion $d'$ of the band is preferably made oval, its greater length being radially of the wheel, so as to allow relative play of the band $b$ in the radial direction.

The edges of the band $d$ are provided with beadings $x$, presenting rounded surfaces to the inside of the bore of the tire $c$, so as to prevent injury to the tire by the band, and that end of the band $d$ and beadings $x$ which is engaged by the hook $f$ is received in a guide-socket, which may consist of a slitted tube or, as indicated, of a pair of slitted tubes $x'$, attached to the fixed end of the band $d$ and extending circumferentially a sufficient distance beyond the latter. The band is countersunk on opposite faces at the ends of the slot $g$ in the band in order to guide the hook $f$ as it enters the slot, and the hook is formed with a forward extension $f'$, which fills or closes the slot $g$ when the hook is in place and forms with the outer face of the band a substantially continuous surface.

$y$ is an elastic cushion or core.

It will be apparent that in securing a jointless hollow elastic tire to the wheel-rim the operation of making fast the fixed end of the holding-on band in the manner shown or otherwise, of engaging the hook of the tension-screw with the slot of the band, and of gearing the same with the nut in the worm-wheel must of necessity be performed before the tire is applied to the wheel, and consequently before the screw and worm-gear can be mounted in position on the wheel-rim. Consequently, as the tire must be sprung onto the wheel-rim with the worm-gear already attached to the tire, means must be provided of drawing the worm-gear into proper position on the wheel-rim and there securing it. As, however, owing to the length of the worm-spindle this cannot be done with the worm in position, means are provided, as above described, whereby to enable the worm to be inserted in its bearings after the other part of the gear has been placed in position and secured to the rim.

I claim—

Means of tightening and securing the internal holding-on band of an elastic tire, consisting in the combination of a tension-screw adapted to make detachable engagement with the band and prevented from revolving while free to move longitudinally, a worm-wheel revolving as a nut on the screw but prevented from moving longitudinally thereof, a worm in gear with the worm-wheel, a bracket wherein the screw, worm-wheel and worm are mounted, a seat in the wheel-rim for the reception of said bracket, and means whereby the bracket may be drawn to and secured in its seat after the engagement of the tension-screw with the holding-on band and the placing of the tire on the wheel-rim have been effected, substantially as described.

WILLIAM FREDERICK WILLIAMS.

Witnesses:
T. W. KENNARD,
C. G. CLARK.